United States Patent [19]

Jensen

[11] Patent Number: 4,632,518

[45] Date of Patent: Dec. 30, 1986

[54] PHASE INSENSITIVE OPTICAL LOGIC GATE DEVICE

[75] Inventor: Stephen M. Jensen, El Segundo, Calif.

[73] Assignee: Hughes Aircraft Company, Los Angeles, Calif.

[21] Appl. No.: 844,243

[22] Filed: Mar. 24, 1986

Related U.S. Application Data

[63] Continuation of Ser. No. 636,448, Jul. 31, 1984, abandoned.

[51] Int. Cl.[4] .......................... G02F 1/01; G02B 5/30
[52] U.S. Cl. ................................ 350/385; 350/354; 364/713
[58] Field of Search ................. 350/354, 385; 364/713

[56] References Cited

U.S. PATENT DOCUMENTS

| | | | |
|---|---|---|---|
| 3,610,731 | 10/1971 | Seidel | 350/354 |
| 4,012,699 | 3/1977 | Gibbs et al. | 350/354 |
| 4,507,776 | 3/1985 | Smith . | |
| 4,515,429 | 5/1985 | Smith et al. | 350/354 |

OTHER PUBLICATIONS

Sarid, Dror, "Analysis of Bistability in a Ring-Channel Waveguide", Optics Letters, vol. 6, No. 11, Nov. 1981, pp. 552-553.
Walker, R. G. et al, "Integrated Optical Ring Resonators Made by Silver Ion-Exchange in Glass", *Applied Optics,* vol. 22, No. 7, 1 Apr. 1983, pp. 1029-1035.
Electronics International, vol. 55, No. 26, Dec. 1982, New York, (US) L. Waller: "Components for Optical-logic Start to Click".
Patents Abstracts of Japan, vol. 6, No. 255, (P-162), 14 Dec. 1982, see the entire document & JP, A, 5638314 (Mitsubishi Denki) 20 Sep. 1982.
Optics Letters/vol. 5, No. 12/Dec. 1980; J. Haavisto and G. A. Pajer, "Resonance Effects in Low-Loss Ring Waveguides".

*Primary Examiner*—Bruce Y. Arnold
*Attorney, Agent, or Firm*—V. D. Duraiswamy; M. J. Meltzer; A. W. Karambelas

[57] ABSTRACT

An optical logic device wherein two light beams are launched into an optical nonlinear resonator, the phase shift characteristics of the resonator cavity being dependent on the intensities of the light beams traveling therethrough. The beams are launched in a manner such that each beam propagates in linearly independent modes whereby the relative phase of the beams does not affect the manner in which the light beams interact within said cavity.

26 Claims, 18 Drawing Figures

PHASE INSENSITIVE OPTICAL LOGIC GATE DEVICE

The Government has rights in this invention pursuant to Contract No. F33615-79-C-1871, awarded by the U.S. Air Force.

This application is a continuation of application Ser. No. 636,448 filed July 31, 1984, now abandoned.

BACKGROUND OF THE INVENTION

1. Field of the Invention

The present invention relates to optical devices and, in particular, to a nonlinear optical logic device in which at least two input light beams having independent modes are launched, the device operating independently of the relative phase between the two inputs.

2. Background Art

Bistable optical devices wherein the intensity of the output optical beam may be in either a low or high state for a given optical input, depending on the prior history of the device, have been previously described in the prior art. The potential applications for such devices include use as optical memory element, limiters, switches and logic gates.

One such example of a prior art bistable optical device is the nonlinear Fabry-Perot interferometer or resonator. The bistable feature of this device is provided by feedback due to mirrors and by the nonlinear refractive index of the medium that fills the device cavity. Although the bistable nature of the device would lead one to conclude that it could be utilized as an optical logic device in a multiple device optical data processing system, the requirement that the two optical input beams be combined prior to launch into the resonator in turn requires that the input beams be in phase coherence in order for the device to perform its intended logic function. This latter requirement is extremely difficult to provide in such systems. Further, Fabry-Perot optical logic "OR" gates could provide problems in complex optical data systems since the output signal phase shift is dependent on the input data, the output "1" logical signal for two input "1s" being different from the output "1" logical signal for an optical input comprising a logical "1" and a logical "0." Compensation for this difference is very difficult.

The use of optical nonlinear ring resonators as filters and bistable devices has also been described. For example, an article by R. G. Walker et al., "Integrated Optical Ring Resonators Made by Silver Ion-Exchange in Glass," *Applied Optics*, Vol. 22, No. 7, pp. 1029–1031 (April, 1983), describes an integrated optical ring resonator fabricated using silver ion-exchanged waveguides and used as a wavelength-selective filter.

In an article by Haavisto et al., "Resonance Effects in Low Loss Ring Waveguides," *Optical Letters*, Vol. 5, No. 12, pp. 510–512 (December, 1980), a technique for fabricating a thin-film ring resonator is described. An article by Sarid, "Analysis of Bistability in a Ring Channel Waveguide," *Optics Letters*. Vol. 6, No. 11, pp. 552–3 (November 1981), discloses the bistable operation of a ring-channel waveguide that is coupled to two line channels.

Although the aforementioned articles illustratte that the bistable (on-off) characteristics of nonlinear ring resonators in response to a single light beam input is widely known, only recently has an attempt been made to configure a device such that two light beams could be applied thereto so that the device could be utilized as an optical logic gate. In particular, an article entitled "Components for Optical Logic," *Electronics*, pp. 31–32 (Dec. 29, 1982), discloses a bistable optical device comprising a nonlinear ring resonator and two waveguide-like channels. The device, a one-chip optical gate, launches an input light beam into the resonator by first combining two optical inputs in one of the waveguide channels. Although this chip provides significant improvements over prior devices, a factor in limiting its use in large optical data processing systems is the same factor that limits wide application of a Fabry-Perat optical logic gate; phase coherency is required between the two optical inputs.

What is therefore desired is to provide an optical device which is capable of providing logic functions in response to at least two optical signal inputs and wherein the device performance is insensitive to the phase coherency of the input signals. Preferably, the logical operation can be performed entirely with optical components.

SUMMARY OF THE INVENTION

The present invention provides a nonlinear optical circuit device which is responsive to at least two light beam inputs applied thereto to provide optical logical gate functions. The device operates in a manner such that the relative phase of the input light beams does not affect the way the beams interact within the device. The present invention provides a closed optical path and an element for launching at least two light beams into the optical path such that the beams propagate in linearly independent modes whereby the interaction between the beams is independent of the relative phase between them. Another element is provided for varying the phase shift of the launched light beams in accordance with the intensities of the beams, and therefore independent of the relative phase between them. A further element provides an output signal representative of the intensity of at least one of the launched light beams.

The optical logic device of the present invention is insensitive to phase differences in the optical inputs, making the device useful in complex logic circuits such as high speed optical data processing/encryption systems. The technique of the present invention enables a one-chip, all-optical gate to be provided, with the potential for attaining multi-gigabit-per-second data speeds while offering immunity to radio-frequency interference in multi-chip optical data processing systems.

BRIEF DESCRIPTION OF THE DRAWINGS

For a better understanding of the invention as well as other objects and further features thereof, reference is made to the following description which is to be read in conjunction with the accompanying drawings wherein:

FIGS. 8a through 7f are oscillograms illustrating the optical input versus optical output for the hybrid ring resonator bistable optical device at various zero-field detunings;

It should be noted that the same reference numerals identify identical components in each of the figures.

DETAILED DESCRIPTION OF THE INVENTION

In order to put the present invention in perspective, a brief review of light wave interaction in a cavity, specifically a resonator cavity, is now set forth.

Electromagnetic energy, such as light, can be characterized as an undulating disturbance moving in a medium with a constant velocity. Propagation of the wave is obtained by the effect being passed in the longitudinal direction. If two identical light beams are combined prior to being introduced into the input end of an enclosed chamber or cavity, and are in phase coherence, the light intensity actually introduced into the cavity will be enhanced (constructive interference). If the light beams are out of phase, the light launched into the cavity will have decreased intensity (destructive interference).

In a Fabry-Perot or ring resonator, electromagnetic radiation is fed back and interferes, either constructively or destructively, with itself. The manner in which it interferes is determined by the phase shift accumulated by the electromagnetic field as it traverses the resonator, or equivalently the number of times the field undulates in the time it takes to complete the feedback loop. When the optical length of the feedback loop is an integral number of wavelengths, the resonator is at "resonance," interference being completely constructive in this condition. The intensity of the radiation in the resonator is at a maximum at resonace, falling to a minimum when the optical length of the feedback loop is an odd number of half-wavelengths. By filling the resonator with a nonlinear material, one achieves a condition in which the velocity of the electromagnetic field and, hence, the optical path length and phase shift depends on the magnitude of the electromagnetic field. The coupling of this intensity-dependent phase shift and the optical feedback gives rise to highly nonlinear transmission characteristics and optical bistability.

The basic principles described hereinabove are the basis for at least two well known prior art optical devices; the Fabry-Perot and ring resonator devices mentioned above. Typically, these devices when appropriately configured may function as either nonlinear transmission devices or bistable optical devices. The discussion that follows immediately is directed to the optical characteristics of resonators, particularly the Fabry-perot and ring resonator resonators. However, the present invention may operate in the nonlinear transmission mode, and such operation is described further below herein.

Figure 1:
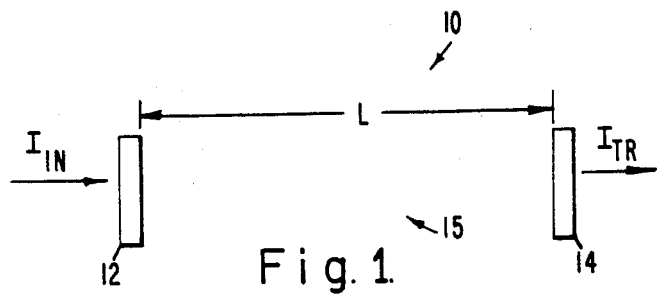
FIGS. 1 and 2 illustrate in simplified form the operation of a Fabry-Perot resonator.

FIG. 1 shows a Fabry-Perot resonator 10 having end mirrors 12 and 14 enclosing optical cavity 15. The transmissivity T of the cavity is given by $$T = 1 / \left[ 1 + \frac{4R}{1-R^2} \sin^2\left(\frac{2\pi L n}{\lambda}\right) \right] \text{ wherein} \quad (1)$$

R is the reflectivity of mirrors 12 and 14; L is the length of the cavity 15; n is the index of refraction of the cavity material (air in FIG. 1) and $\lambda$ is the wavelength of the incident light beam $I_{in}$.

Figure 2:
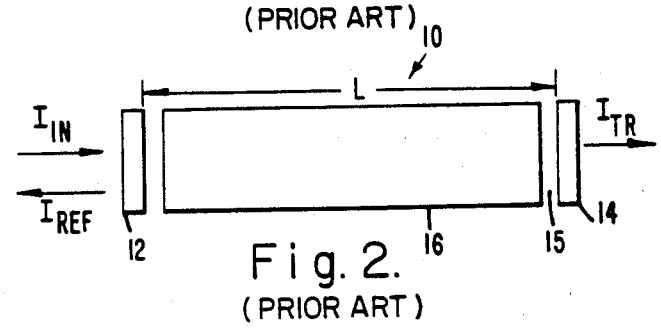

In order to provide bistable and nonlinear optical operation, a nonlinear material 16, such as GaAs, is interposed in cavity 15 between mirrors 12 and 14 (FIG. 2). In this case, the index of refraction term n in equation (1) has two components, a normal linear term $n_o$ independent on the intensity of light propagating in the material, and a nonlinear term $n_2 I$, wherein I is the intensity of light propagating in the nonlinear material 16. Thus, the transmission T of the Fabry-Perot resonator 10 depends upon the intensity of the light beam within the resonator. It is observed that introducing light in the Fabry-Perot device 10 pulls the device in either on or off resonance and provides behavior patterns which can lead to optical nonlinear and bistable characteristics.

The argument of the sine squared term of equation (1) can be rewritten as:

$$\frac{2\pi n L}{\lambda} = kL \quad (2)$$

wherein kL is the total phase shift introduced within the resonator. (It is noted again that although the equations described are for a Fabry-Perot device, they also characterize the operation of single input ring resonators.) This can then be rewritten as:

$$kL = \frac{2\pi n_o L}{\lambda} + \frac{\Sigma \pi L}{\lambda} n_2 I \quad (3)$$

the first term of the right-hand side of the equation being referred to as the zero field detuning $\phi_o$ (for light intensity of zero this term provides the phase shift), the second term of the right hand side of the equation being proportional to the intensity of the transmitted resonator light $I_{TR}$. It can be shown that the intensity of the resonator light input, $I_{IN}$ is related to the transmitted light intensity $I_{TR}$ by the equation:

$$I_{IN} = \frac{I_{TR}}{T} \quad (4)$$

With $\phi_o = 0$, the light beams within the resonator cavity add up constructively and, for small input intensities (fields), an output essentially equal to the input is provided. If $\phi_o$ is not equal to zero, phase shift is introduced into the resonator cavity 15 causing something less than total constructive interference to occur with small input intensity. However, the phase shift added with increasing input light intensity eventually causes a total constructive interference (resonance) to occur at some higher level of input intensity. In other words, by varying $\phi_o$ and then increasing the light input intensity, different transmission behaviors or characteristics can be provided due to the variation of phase shifts within the resonator cavity 15. By inspecting equation (3), it is apparent that $\phi_o$ can be varied by changing $\lambda$, L or $n_o$. $N_o$, in turn, can be varied by many effects, such as the electro-optic effect, piezo-optic effect, magneto-optic effect, and the like.

Figure 3:
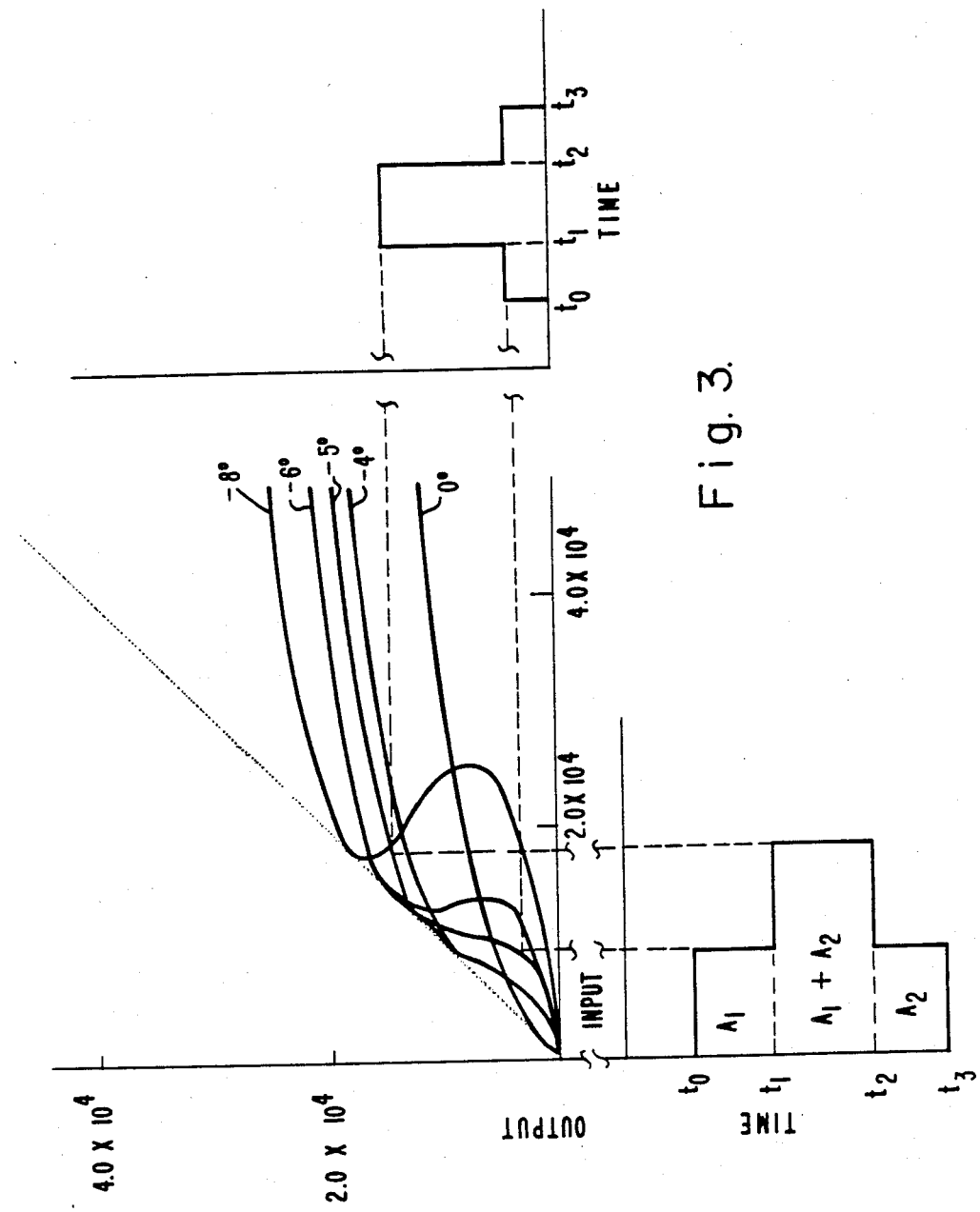
FIG. 3 illustrates the typical input/output characteristics on a nonlinear Fabry-Perot resonator.

FIG. 3 illustrates typical input/output characteristics of the nonlinear Fabry-Perot resonator 10 for the transmitted component. The output light intensity $I_{TR}$ is plotted versus the input light intensity for various values of the zero field detuning $\phi_o$. (The characteristics for a typical nonlinear ring resonator with a single input are substantially similar.) As can be seen, as $\phi_o$ decreases from 0° towards −8° (zero field detuning is given in degrees due to the sine function of equation (1)), the characteristic varies from describing a limiter device ($\phi_o=0$) to one describing a bistable curve ($\phi_o=-8°$) wherein the characteristic curve bends back on itself. For the purpose of providing an optical logic device function, a characteristic curve such as provided by $\phi_o=-5°$ shows sufficient nonlinearity.

In order to demonstrate nonlinear operation in connection with two light beams, to show a digital logic function, the lower portion of the figure illustrates the case wherein two optical pulses, $A_1$ and $A_2$, are applied in time sequence to a Fabry-Perot device having the $\phi_o=-5°$ characteristic. The right-hand portion of the figure illustrates the resultant output intensities for the input conditions shown in the lower portion of the figure at times $t_0-t_3$. At time $t_0$, pulse $A_1$ is applied to the device and a relatively low output intensity pulse (approximately $0.25 \times 10^4$ W/cm$^2$) is is generated. At time $t_1$, both pulses $A_1$ and $A_2$ are combined and then applied to the device. It can be seen that a relativity large output pulse, approximately $1.5 \times 10^4$ W/cm$^2$, or six times the output when signal $A_1$ alone is applied, is generated. At time $t_2$, only the $A_2$ pulse is applied to the device and once again a $0.25 \times 10^4$ W/cm$^2$ light pulse is generated. At time $t_3$, the inputs return to zero, producing a zero output level. Thus, applying the optical pulse sequence illustrated to the characterisitc curve selected ($\phi_o=-5°$) provides an AND gate function.

The threshold values of the device can be easily adjusted such that an OR gate function is provided. Thus, in FIG. 3, again using the $\phi_o=-5°$ curve, by setting the input beam intensities at about $2.0 \times 10^4$ W/cm$^2$, the output intensity is nearly the same for single and combined beam inputs, since the flat, upper portion of the curve is used. Again, no input yields no output. An OR gate function is thus provided.

Figure 4:
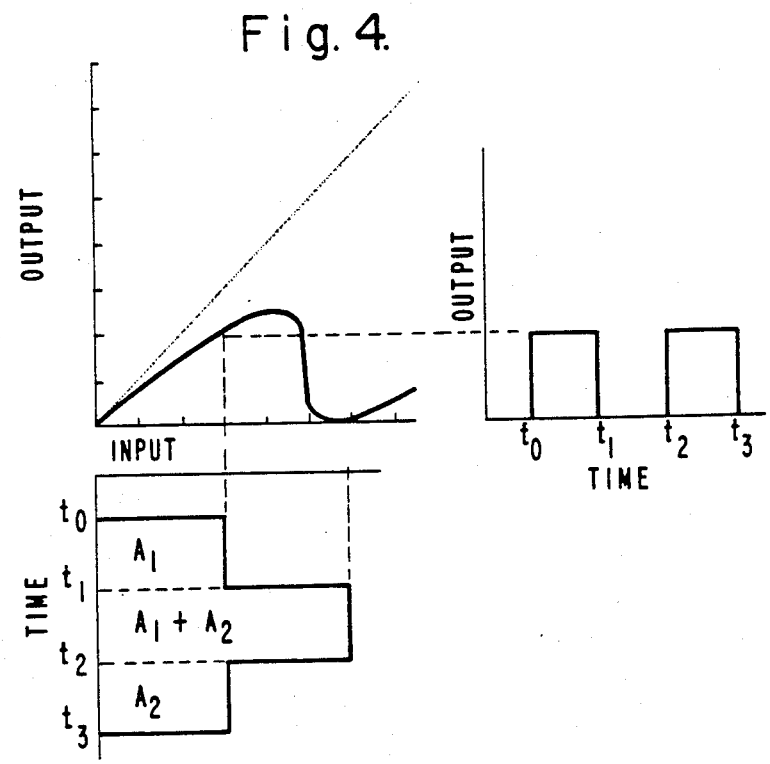
FIG. 4 is a schematic (top) view of a hybrid ring resonator.

An exclusive OR function can also be obtained, by utilizing the reflected rather than the transmitted component of the output of the device. FIG. 4 illustrates typical input/output characteristics of the nonlinear Fabry-Perot resonator 10, similar to the graph shown in FIG. 3 but plotting the intensity of the reflected output $I_{REF}$, rather than the transmitted output itensity $I_{TR}$. It is noted that the reflected light output $I_{REF}$ is related to the transmitted output, ignoring losses, by:

$$I_{REF}=I_{IN}-I_{TR} \tag{5}$$

By applying the same sequence of input light beams as described in connection with FIG. 3, outputs are generated, as can be seen in the right-hand portion of FIG. 4, which correspond to the operation of an exclusive OR gate.

Although the characteristic curves of FIGS. 3 and 4 indicate that Fabry-Perot devices can be utilized for optical logic, at least as far as a single gate is concerned, using the Fabry-Perot device in a large scale optical data processing system is impractical. This is because, as set forth hereinabove, the Fabry-Perot operates by depending on the relative phase of the combined input optical beams and requires initial phase coherency of the input beams, a complex and relatively expensive task. Furthermore, in a large optical circuit including OR gates, the data dependent phase shifts that are generated in the output signals are not easily compensated to permit their use as input signals in subsequent logic stages.

In order to avoid the disadvantages of the Fabry-Perot optical logic gate, the present invention provides a novel technique wherein the input optical beams are separately launched into a ring resonator as linearly independent modes. When practised in accordance with the present invention, this eliminates phase constraints with respect to input beams for optical logic devices. Thus, the two separately launched input optical beams interact appropriately, independent of their relative phases within the resonator cavity.

Launching of linearly independent (different modes) optical beams in a resonator cavity can be accomplished in a number of ways. In the preferred embodiment, as described in more detail hereinbelow, light beams are launched directly into a ring resonator cavity in different directions (counterpropagating waves) for phase independence.

A second technique for launching independent optical beams is to utilize optical devices (i.e., beamsplitters and polarization filters) to provide two light beams of different polarizations which are then launched into the resonator cavity.

Still another technique utilizes multimode waveguides to launch light beams of different modes into the resonator or other nonlinear optical device. It should be noted that the principles of the present invention of launching light beams of independent modes into a nonlinear optical device to obtain optical logic gate functions can be used with Fabry-Perot or nonlinear ring resonators. In the present invention, a ring resonator is used as the nonlinear optical element. In addition, the second technique mentioned above (opposite polarization) leads to data dependent output polarizations, which are just as difficult to handle as data dependent phase shifts, and the final technique (multimode waveguides) yields inefficient nonlinear coupling between the two modes and data dependent output modes.

Figure 5:
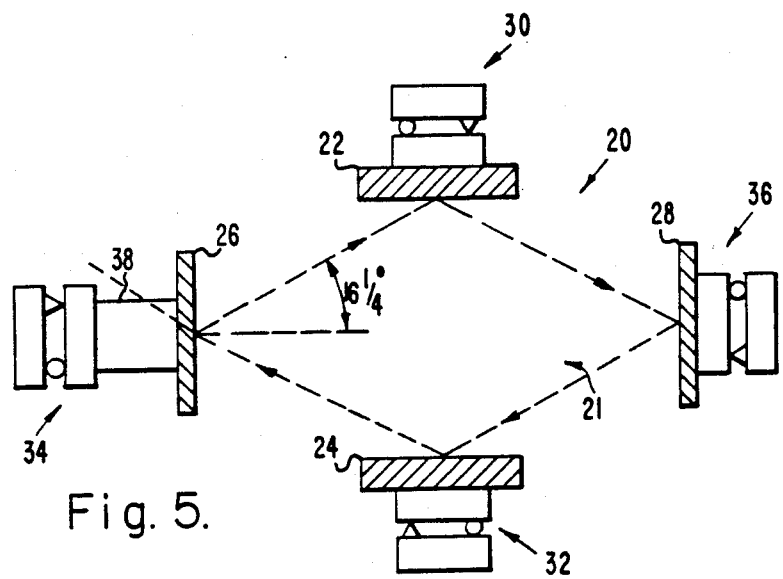
FIG. 5 is a simplified schematic of the hybrid ring resonator utilized in a manner to illustrate its optical bistability characteristics.

FIG. 5 is a simplified schematic of a ring resonator which may be used to provide the nonlinear and optical bistability characteristics described with reference to FIG. 3. In particular, a "hybrid" structure is shown, in which nonlinearity is provided by way of an electro-optical servo loop, described hereinafter. Two totally reflecting mirrors 22 and 24 and two partial reflectors 26 and 28 are affixed adhesively to adjustable mirror mounts 30, 32, 34 and 36, respectively, as illustrated. A piezoelectric cell 38 is sandwiched between reflector 26 and mount 34. The piezoelectric cell 38 is used to adjust the round-trip length of the light beam inside the resonator cavity 21 by displacing reflector 26, thus varying the phase shift characteristics of the cavity as will be described in more detail hereinafter. In this embodiment, the partial reflectors 26 and 28 are approximately 90% reflective. However, other reflectivities may be suitable on other applications. In general, if a substantially lower reflectivity is used, a higher degree of nonlinearity is required and the discrimination between different output states is reduced.

The device 20 is operated as a ring resonator by setting the correct input beam angle to close the loop, in this embodiment selected to be 16¼°, and adjusting the mirrors 22 and 24 to maximize the resonant characteristics of the cavity.

Figure 6:
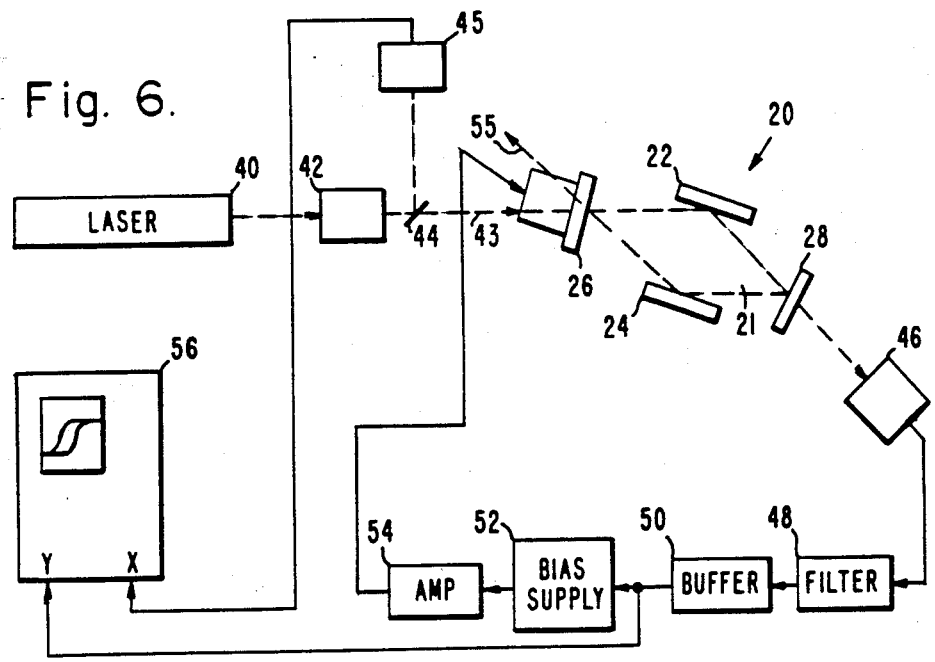
FIG. 6 is a schematic of the hybrid ring resonator of FIG. 5 in an arrangement which utilizes an electronic circuit to control optical path length.

FIG. 6 shows device 20 in more detail, arranged to provide the aforementioned characteristics. As mentioned above, in this embodiment an electronic circuit is utilized to control the ring optical path length, L, to vary the cavity phase shift and thereby provide the desired nonlinear optical characteristics. (An all optical device for providing optical logic gates is described below in connection with FIGS. 10 and 11.)

The output of a single mode 514.5-nm argon laser 40 is modulated externally by a Pockels cell modulator 42. To demonstrate the principles of operation, this modulator is driven with a triangular wave; generating a modulation depth greater than 95%. The modulated optical beam 43 is launched into the ring resonator cavity 21 via partial reflector 26. Optical radiation transmitted by the resonator 20 is detected by a reverse-biased PIN diode 46. PIN diode 46 generates an electrical signal the magnitude of which is proportional to the intensity of the light beam incident thereon. The output of the PIN diode 46 is processed first by a lowpass filter 48 to prevent oscillation of the electrical feedback loop illustrated. After being filtered, the electric signal passes through a buffer 50 and to a bias supply 52 which adds a constant voltage to the signal. The signal is then amplified by a high-voltage amplifier 54 and applied to the piezoelectric cell 38. Piezoelectric cell 38 varies the position of reflector 26 in response to the magnitude of the voltage applied thereto from amplifier 54, thus effectively varying the propagation length of cavity 21. The phase shift of the propagated light is thus varied in proportion to the intensity of the light propagated through cavity 21, a condition necessary to generate characteristic curves similar to FIG. 3. For display purposes, the output of buffer 50 also drives the "Y" input of an oscilloscope 56 and the electrical output of PIN diode 45, representative of the optical input, is applied to the "X" input.

FIG. 8 shows oscillograms of the input/output characteristics of device 20 generated by oscilloscope 56. In FIG. 8a, the bias supply is set at 60 mV, thus voltage biasing device 20 (while laser 40 is turned off) to a zero-field detuning of approximately 0°. The figure shows that as the optical input increases, the transmission of the device decreases, thus illustrating the optical limiting characteristics described with reference to FIG. 3. FIG. 8b shows device behavior with a bias of 50 mV, correspoonding to a zero-field detuning of approximately −18°. Although the open loop at the low-intensity end of the trace seems to indicate the onset of bistability, it actually results from slowing as the switch point is approached. FIG. 8c corresponds to a bias signal of 40 mV, or zero-field detuning of approximately −36°. This figure clearly indicates nonlinearity (in fact, it shows bistability), with a nearly 4:1 difference in intensity between the high and low transmitting states.

Figure 8A:
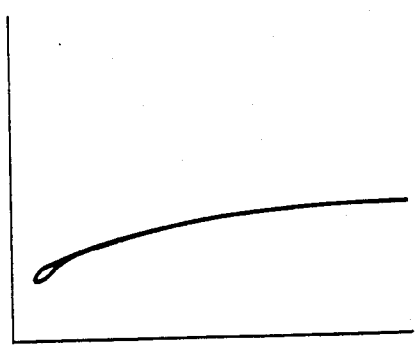
Figure 8B:
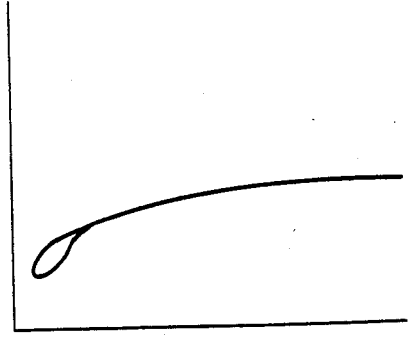
Figure 8C:
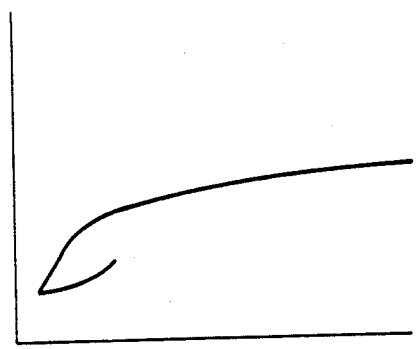
Figure 8D:
Figure 8E:
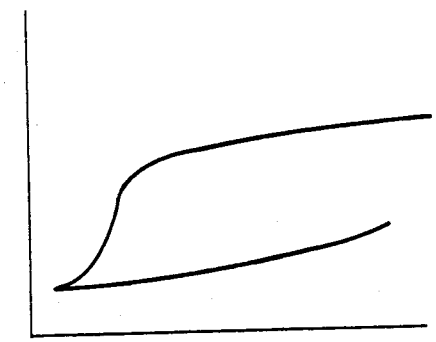
Figure 8F:
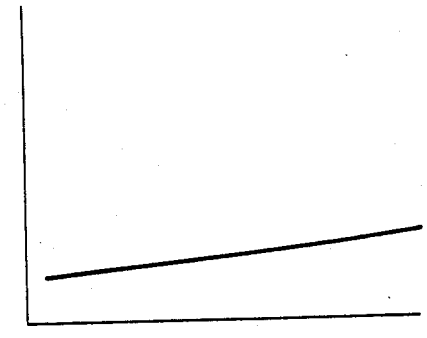

FIGS. 8d and 8e show how the device operates with even greater zero-field detuning. In FIGS. 8d and 8e, the bias voltages are 30 mV and 20 mV, respectively, with corresponding detunings of −54° and −72°. With a bias voltage of 10 mV corresponding to a zero-field detuning of −90°, the input is insufficient to switch the device to the high-output state as shown in FIG. 8f. The above illustrates that device 20 can operate as an optical logic device in a manner similar to the Fabry-Perot device described with reference to FIG. 3. It should be noted that the configuration of device 20 prevents the reflected optical beam 55 from reentering the laser source 40. This is important since even a small amount of feedback can seriously degrade the characteristics of most lasers.

Figure 7:
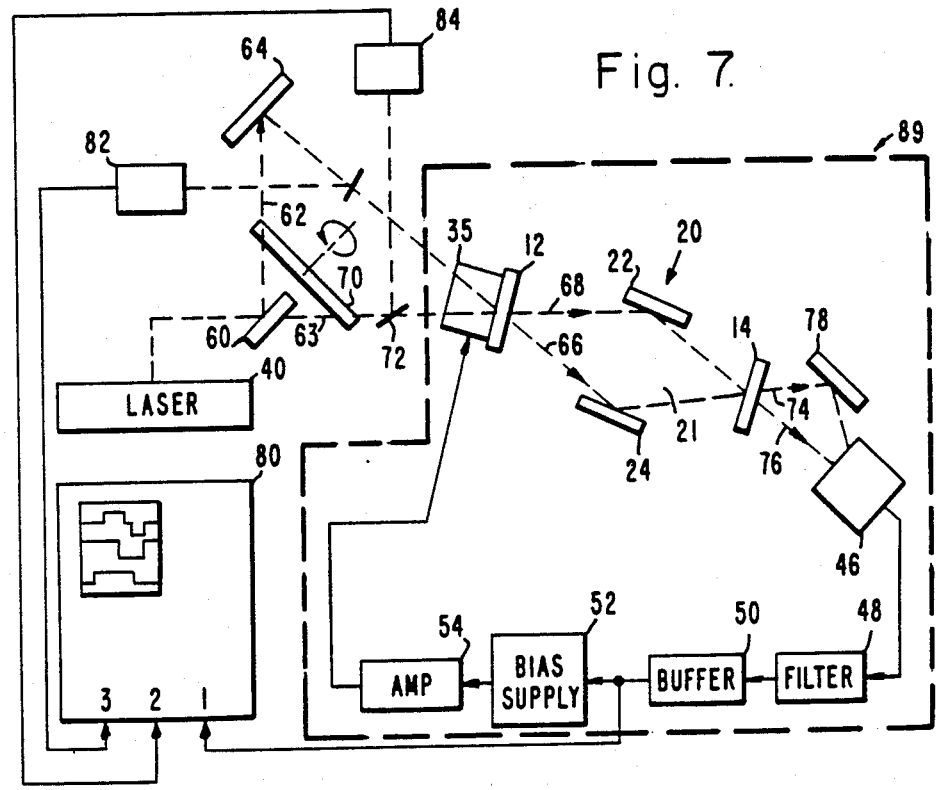
FIG. 7 is a schematic of the hybrid ring resonator arranged to demonstrate the principle of the present invention, to provide a phase insensitive optical logic gate.

FIG. 7 illustrates device 20 arranged in a manner to provide optical logic gate functions. In particular, a beam splitter 60 supplies a second input beam 62 for the resonator device 20. Beam 62 is reflected off mirror 64 and launched into device 20 as a counter-propagating beam 66. Beam portion 63 is transmitted through beam splitter 60 into resonator cavity 21 as beam 68 via a light chopper 70 and beam splitter 72, beam 68 propagating in cavity 21 in a direction opposite to the direction of propagation of beam 66. Beam portions 74 and 76 of beams 66 and 68, respectively, are transmitted through mirror 14 to detector 46, mirror 78 directing beam 74 to detector 46. In order to avoid interference effects betwen the two beams, mirror 78 is adjusted to ensure that beams 74 and 76 do not overlap on detector 46. Mechanical chopper 70 is positioned so as to interrupt both input beams 62 and 63.

In order to observe the characteristics generated by the configuration shown in FIG. 7, a portion of the input beams 62 and 63 are coupled to first and second "Y" inputs of a multi-trace oscilloscope 80 via PIN detectors 82 and 84, respectively. The output beams are coupled to a third "Y" input of oscilloscope 80 via PIN detector 46, filter 48 and buffer 50.

Figure 9A:
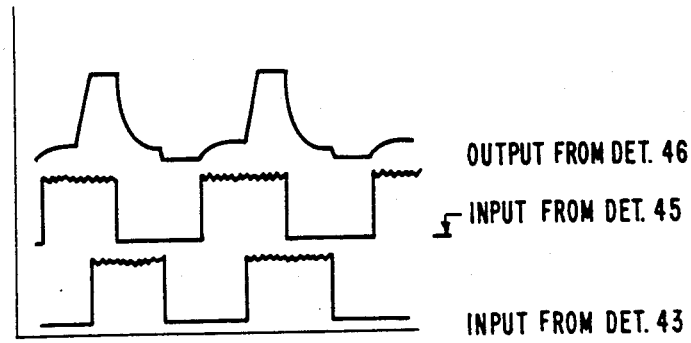
FIGS. 9a and 9b are oscillograms of the input and output optical beams from the hybrid ring resonator operating as an optical AND gate and optical OR gate, respectively, generated by the schematic in FIG. 6.

The display produced by the arrangement of FIG. 6 is shown in FIG. 9. FIG. 9a shows an oscillogram of the device 20 operating as an optical AND gate. The lowest trace in the figure is the light detected by detector 82 in FIG. 7 and comprises a square wave operating at a frequency of approximately 12 Hz. The central trace is the light detected by detector 84 of FIG. 7 and is identical to that from detector 82, except for a 90° phase shift introduced by appropriately positioning chopper 70. For illustrative purposes, all four binary inputs are generated in each cycle. The uppermost trace in the figure shows the total light transmitted by the device 20. When both optical inputs are high, the detector output is approximately 45 mV. However, when only one input is present, the output drops to 1/5 of this value, or approximately 9 mV. This corresponds to operation as an optical AND gate.

It should be clear that in FIG. 7 the components that actually comprise the hybrid ring resonator are within the dashed box labeled 89, the other components of the schematic being used to both demonstrate and illustrate the optical logic gate capabilities of the hybrid resonator 89. In operation as an optical logic gate, light beams 62 and 63 would be provided by separate sources, i.e., either from separate light beams initially introduced into the circuit containing the hybrid resonator 89 or from the outputs of other optical logic gates.

Figure 9B:
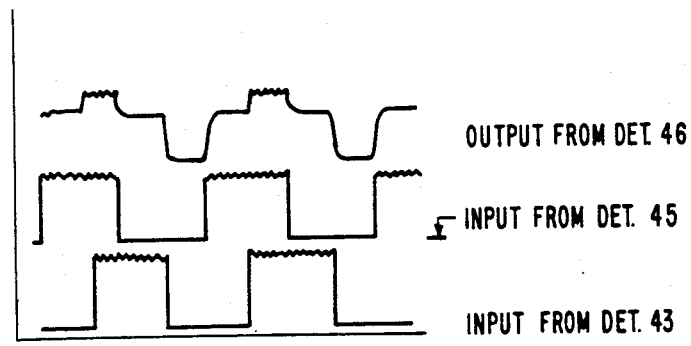

The operating characteristic of an OR gate are obtained by increasing the effective input power. These data are shown in FIG. 9b. As in FIG. 9a, the input signals are shown by the two lower traces in the figure. The upper trace shows the detected output. When both inputs are present, an output of 36 mV is obtained. With only one input, the output drops by only 29% to 25.5 mV, device 20 thus operating as an optical OR gate in the hybrid arrangement shown in FIG. 6. The insensitivity of device 20 to the relative phase between the optical inputs 62 and 63 has been demonstrated by slightly disturbing mirror 64 in FIG. 6. No effect on the outputs shown in FIG. 8 were observed.

Figure 10:
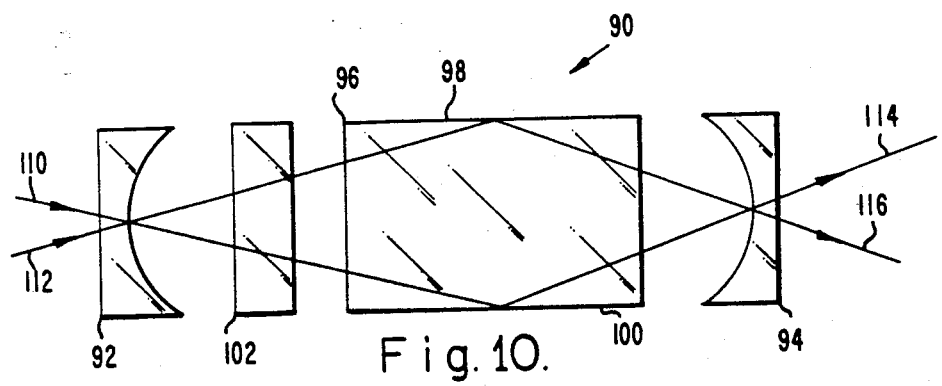
FIG. 10 is a schematic of an all optical logic gate using the principles of the present invention.

FIG. 10 is a schematic of another nonlinear ring resonator device 90 constructed and operating in accordance with the present invention. The device 90 illustrated in FIG. 10 is essentially all optical and does not require electronic circuitry to provide the nonlinearity required for operation as an optical logic device. The resonator device comprises mirrors 92 and 94, preferably curved as shown for increased resonator efficiency. Glass member 96 to provide totally reflecting surfaces 98 and 100, and a block of nonlinear material 102, typically GaAs, are interposed between mirror 92 and glass member 96. Nonlinear material 102 is rotated to the Brewster angle to minimize reflections from material 102.

As shown, two input optical beams, $I_A$ 110 and $I_B$ 112, are launched into the cavity 104 and two output beams, $O_A$ 114 and $O_B$ 116, emerge from mirror 94. The device 90 may be used as an OR gate or an AND gate, depending, as above, upon the levels of the input optical beams. If the device is used as an OR gate both output beams must be combined for use as an output signal. If the device is used as an AND gate, either output beam may be used as an output signal.

Figure 11:
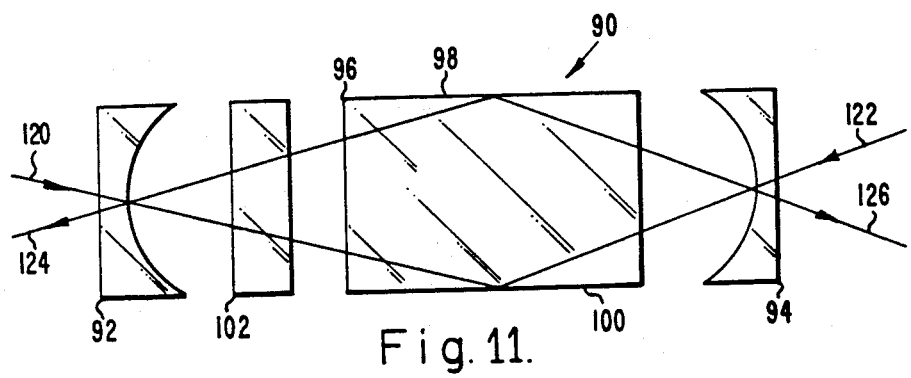
FIG. 11 is a schematic of the device of FIG. 10 shown operating in an alternative mode.

FIG. 11 is a schematic of the device described above in connection with FIG. 10, shown operating in an alternative mode. Input beams $I_A$, 120 and $I_B$, 122 are shown entering opposite ends of device 90, and output beams $O_A$, 124 and $O_B$, 126 likewise are shown exiting opposite ends. While in the mode depicted in FIG. 10 the device 90 utilizes the transmitted characteristics of the output beams, the mode depicted in FIG. 11 utilizes the reflected characteristics, thus permitting its use as an exclusive OR gate. When utilized in this manner, both outputs must be combined for use as an output signal.

Figure 12:
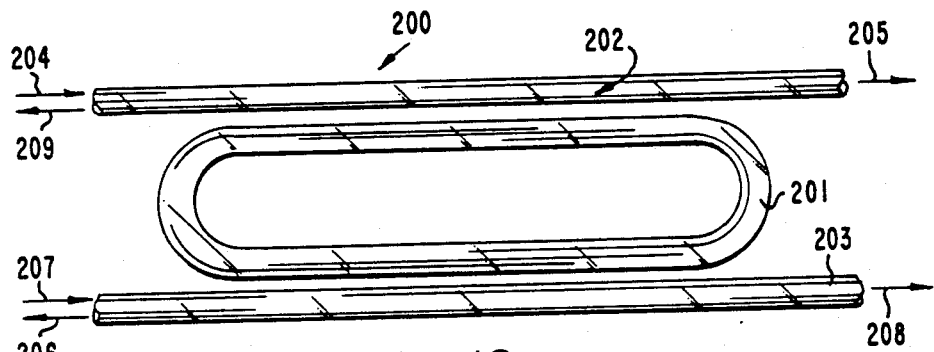
FIG. 12 is a schematic of an integrated optic embodiment of an optical nonlinear ring resonator device used in accordance with the principles of the present invention.

FIG. 12 is a schematic of another embodiment of an optical nonlinear ring resonator device 200 which can be adapted to utilize the principles of the present invention. The device 200 illustrated in FIG. 12 is essentially all optical and does not require electronic circuitry to provide the nonlinearity required for operation as an optical logic device. The resonator comprises a racetrack shaped closed optical waveguide 201, placed between and in close proximity to two straight optical paths 202 and 203. Because of their close proximity to the closed optical path 201, light entering the straight paths 202 and 203 is coupled into the closed path via a process known as evanescent field coupling. The regions over which the straight and closed optical paths are in close proximity act, in effect, as the input and output partial reflectors 92 and 94 of FIG. 10. The curved sections of closed optical path 201 act, in effect, as the total reflectors 98 and 100 of FIG. 10. Optical nonlinearity is introduced into the cavity as a result of the optically nonlinear material in which the optical paths are fabricated or as a result of materials added to the structure containing the optical paths (e.g.: overlayers, materials diffused in, etc). The refractive index of the nonlinear material varies with the intensity of light input, thereby altering the optical path length and providing the desired nonlinear optical characteristics. As illustrated, an input optical beam, 204, is launched into the straight optical path 202, and output optical beams 205 and 206 exit from the straight optical paths 202 and 203. Device 200, having the single optical input beam 204 launched into the optical path 202, provides nonlinear and bistable characteristics similar to those shown in FIGS. 3, 8, and 9. By launching a second optical beam 207 into the optical path 203, a counterpropagating mode is launched into the closed optical path (resonator) 201 and outputs 208 and 209 are generated. By selecting the appropriate nonlinear material in which to fabricate the device and the appropriate zero-field detuning, device 200 can be utilized as an all-optical logic gate.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An optical logic gate device comprising:
   optical path means for providing a closed optical path;
   launch means for launching at least two light beams into said optical path means, each launched light beam propagating in linearly independent modes, whereby the interaction between said beams is independent of the relative phase between said beams;
   phase shift varying means for varying the phase shifts of said launched light beams by varying the optical path lengths of said beams in accordance with the intensities of said beams; and
   output means for providing an output signal representative of the intensity of at least one of said launched light beams and independent of the relative phase between said beams.

2. The device of claim 1 wherein said optical path means comprises a ring resonator.

3. The device of claim 1 or claim 2 wherein said phase shift varying means comprises a nonlinear optical material within said optical path means, the phase shift provided by said material being dependent upon the intensity of the two light beams propagating therethrough.

4. The device of claim 2 wherein said phase shift varying means comprises means for varying the length of said resonator.

5. The device of claim 3 wherein the phase shift of said launched light beams is selected prior to the launching of said light beams to establish a resonator nonlinear transmission characteristic such that a specific logic gate function is provided.

6. The device of claim 1 wherein said light beams are launched into said optical path means such that the light beams propagate in opposite directions.

7. The device of claim 1 wherein each of said light beams are launched into said optical path means with a different polarization.

8. The device of claim 1 wherein said light beams are launched into said optical path means from a multimode waveguide, each light beam corresponding to a different waveguide mode.

9. An optical logic device comprising:
a ring resonator comprising first and second oppositely disposed partial reflectors and first and second oppositely disposed totally reflecting surfaces, said first partial reflector functioning as an optical input port and said second partial reflector functioning as an optical output port;
means for launching two light beams into said ring resonator, each launched light beam propagating in linearly independent modes such that the relative phase of the beams does not affect the manner in which the beams interact within said resonator;
means responsive to the light energy transmitted through one of said partial reflectors for generating an electrical signal, the magnitude of which is proportional to the intensity of said light energy; and
means responsive to said electrical signal for varying the phase shift of said light beams as the light beams propagate through said ring resonator.

10. The device of claim 9 wherein said electrical signal responsive means causes the position of one of said reflectors to vary in proportion to the magnitude of said electrical signal thus varying said phase shift by varying the effective length of said resonator.

11. The device of claim 9 wherein said electrical signal responsive means causes the index $n_0$ to vary by means of the electro-optic effect.

12. The device of claim 9 wherein the phase shift is selected prior to the launching of said light beams to establish a resonator nonlinear transmission characteristic such that a specific logic function is provided.

13. The device of claim 9 wherein said light beams are launched into said resonator such that the light beams propagate in opposite directions.

14. A method for providing optical logic gate functions comprising the steps of:
providing a closed optical path;
launching at least two light beams into said closed optical path, each launched light beam propagating in linearly independent modes whereby the interaction between said beams is independent of the relative phase between said beams;
varying the phase shifts of said launched light beams by varying the optical path lengths in accordance with the intensities of said beam; and
providing an output signal representative of the intensity of at least of said launched light beams and independent of the relative phase between said beams.

15. The method of claim 14 wherein said optical path comprises a ring resonator.

16. The method of claim 14 or claim 15 wherein the variation in phase shift is provided by a nonlinear optical material within said optical path, the phase shift being dependent on the intensities of the two light beams propagating therethrough.

17. The method of claim 14 wherein said phase shift is varied by varying the effective length of said ring resonator.

18. The method of claim 17 wherein the phase shift is selected prior to the launching of said light beams to establish a resonator nonlinear transmission characteristic such that a specific logic device function is provided.

19. An optical logic device comprising:
optical path means comprising an optical waveguide fabricated in a planar integrated optic geometry, said waveguide providing a closed optical path;
launch means for launching at least two light beams into said optical path means, each launched light beam propagating in linearly independent waveguide modes whereby the interaction between said modes is independent of their relative phase;
phase shift varying means for varying the phase of the light in said waveguide modes in accordance with the intensity of the light in said modes; and
output means for providing an output signal representative of the intensity of at least one said mode and independent of the relative phase between said modes.

20. The device of claim 19 wherein said optical path means comprises a ring resonator.

21. The device of claim 19 or claim 20 wherein said phase shift varying means comprises a nonlinear optical material comprising said optical path means the phase shift provided by said material being dependent on the intensity of the light therein.

22. The device of claim 19 or claim 20 wherein said phase shift of said launched waveguide modes are selected prior to the launching of said waveguide modes to establish a resonator nonlinear transmission characteristic such that a specified logic gate function is provided.

23. The device of claim 20 wherein the light in said waveguide modes is launched into said optical path means such that the modes propagate in opposite directions.

24. The device of claim 20 wherein the light in said waveguide modes is launched into said optical path means such that the light propagates codirectionally in different modes.

25. The device of claim 20 wherein said phase shift varying means comprises a nonlinear optical material resulting from materials added to the waveguide structure, the phase shift provided by said material being dependent on the intensity of the light therein.

26. The device of claim 19 wherein said phase shift varying means comprises a nonlinear optical material resulting from materials added to the waveguide structure, the phase shift provided by said material being dependent on the intensity of the light therein.

* * * * *